Figure 1:
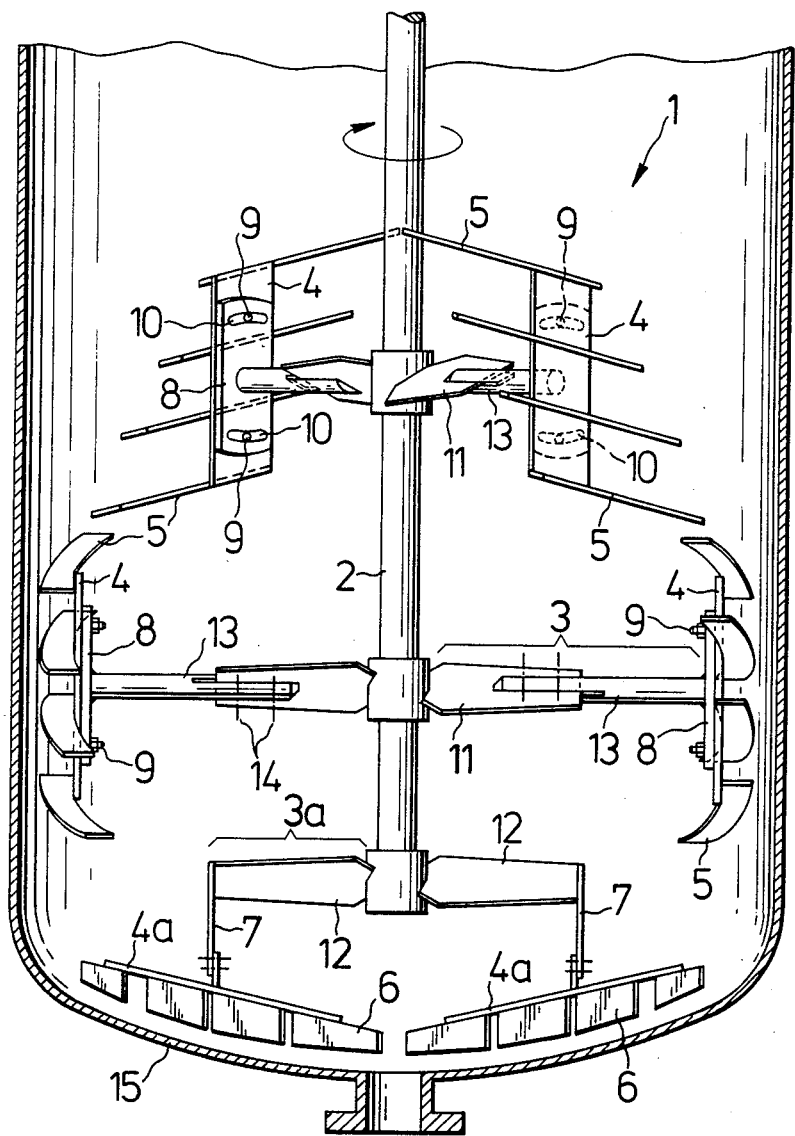

United States Patent [19]

Ott et al.

[11] Patent Number: 4,552,461
[45] Date of Patent: Nov. 12, 1985

[54] STIRRER FOR STIRRING NEAR A VESSEL WALL

[75] Inventors: Karl-Erich Ott; Thomas Behrens, both of Hamburg, Fed. Rep. of Germany

[73] Assignee: Hoechst Aktiengesellschaft, Fed. Rep. of Germany

[21] Appl. No.: 647,162

[22] Filed: Sep. 4, 1984

[30] Foreign Application Priority Data

Sep. 6, 1983 [DE] Fed. Rep. of Germany ....... 3332069

[51] Int. Cl.[4] .......................... B01F 7/18; B01F 7/24; B01F 7/32
[52] U.S. Cl. .................................. 366/279; 366/194; 366/312; 366/326; 366/329
[58] Field of Search ............... 366/325, 326, 327, 328, 366/329, 279, 309, 312, 194, 195, 196

[56] References Cited

U.S. PATENT DOCUMENTS

| 168,384 | 10/1875 | Duwel | 366/329 |
|---------|---------|-------|---------|
| 2,498,125 | 2/1950 | Knudsen | 366/326 |
| 3,333,827 | 8/1967 | Lodige | 366/329 |
| 3,469,948 | 9/1969 | Anderson | 366/325 |
| 3,635,901 | 1/1972 | Urgesi | 366/325 |
| 4,090,696 | 5/1978 | Kipke | 366/327 |
| 4,225,247 | 9/1980 | Hodson | 366/312 |
| 4,456,382 | 6/1984 | Mahler | 366/326 |
| 4,479,721 | 10/1984 | Rieger | 366/327 |

Primary Examiner—Robert W. Jenkins
Attorney, Agent, or Firm—Berman, Aisenberg & Platt

[57] ABSTRACT

In this stirrer, the stirrer arms (3, 3a) are arranged radially on the drive shaft (2) and are provided with plates (4, 4a). On these plates, stirring elements (5, 6) are arranged at a distance and inclined relative to one another, in such a way that their shadow areas overlap in the direction of revolution or at least are almost contiguous.

11 Claims, 3 Drawing Figures

STIRRER FOR STIRRING NEAR A VESSEL WALL

The invention relates to a stirrer for stirring near a vessel wall, the drive shaft having several stirrer arms which extend radially from the shaft.

When exothermic reactions, for example polymerizations, are carried out in stirred kettles, both thorough mixing and the highest possible heat transfer coefficient are desired. In polymerization, both of these are often made more difficult by the fact that the viscosity of the batch increases with the progress of the reaction. Whilst it is still relatively easy to remove the heat of reaction at the beginning of the reaction, heat transfer becomes very low in the case of viscosities greater than 10 pascal, if stirrers are used which do not move near the wall, and this necessarily leads to longer reaction times. On the other hand, when the known stirrers (moving near the wall), such as anchor stirrers and helical stirrers, are used, the energy input is so high that the cooling effect is markedly reduced thereby.

It is accordingly the object of the invention to provide a stirrer which is equally suitable for low-viscosity fluids and up to higher-viscosity fluids and which, with a comparatively minimal energy input, ensures thorough mixing of the reactor contents and hence good heat transfer.

The object is achieved by means of a stirrer, wherein the stirrer arms are provided with plates, on which stirring elements are arranged at a distance from and inclined relative to one another, in such a way that their shadow areas overlap in the direction of revolution or at least are almost contiguous.

In one embodiment, some of the stirrer arms are designed as conveying elements which are inclined in the direction opposite to that of the stirring elements. The conveying elements can be designed to have a variable length, and the plates can be arranged perpendicular to the stirrer arms. In addition, the plates can be arranged to be rotatable about the stirrer arm axis.

Figure 2:
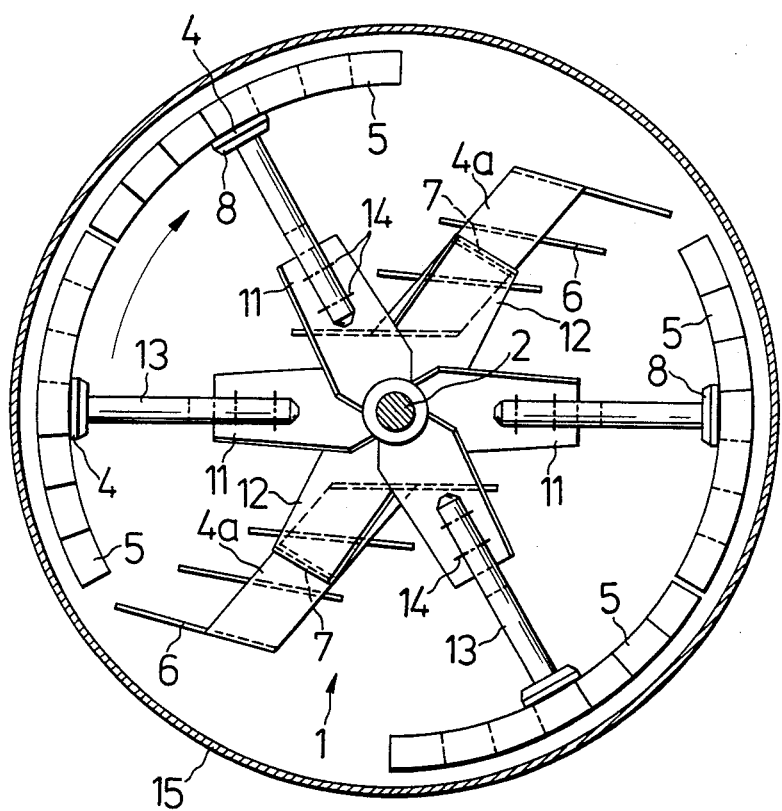
Figure 3:
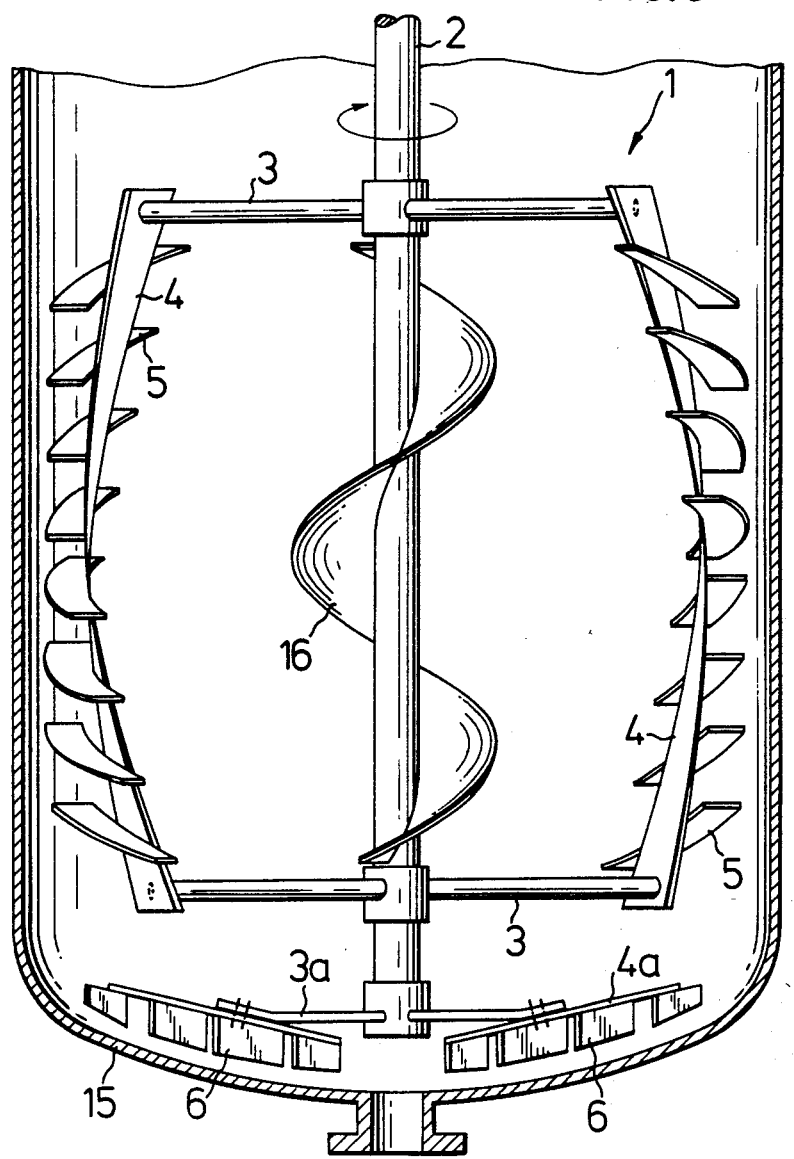

The invention is explained below in more detail by reference to drawings which represent only two possible embodiments and in which FIG. 1 shows a side view of the stirrer, FIG. 2 shows a plan view of the stirrer according to FIG. 1 and FIG. 3 shows a side view of an alternative embodiment of the stirrer.

The drive shaft 2 of the stirrer 1 is provided with stirrer arms 3, 3a. Plates 4, 4a carrying stirring elements 5, 6, are arranged on the free ends of the stirrer arms 3, 3a. The stirrer shown in FIGS. 1 and 2 has, in addition to stirring elements 5 near the wall, also stirring elements 6 which are near the bottom and the plates 4a of which are connected to the stirrer arms 3 via struts 7. The plates 4 for the stirring elements 5 near the wall are arranged perpendicular to the direction to the stirrer arms 3. The stirrer arms 3 of the stirring elements 5 near the wall can be provided with flanges 8 which carry devices 9 (bolts, screws or the like) to enable the plates 4 to be rotated about the stirrer arm axis.

When bolts or screws are used as the device 9, the plates 4 can be provided with corresponding recesses 10 in which the devices 9 are guided. The product circulation can even be improved if at least some of the stirrer arms 3, 3a, are designed as conveying elements 11, 12. The conveying elements 11, 12 are inclined in the direction opposite to that of the stirring elements 5. For the purpose of changing the distance of the stirring elements 5 from the wall, the stirrer arms 3 can be divided for altering their length. According to FIGS. 1 and 2, the stirrer arms can consist of a conveying element 11 and a stirrer arm part 13 provided with a slot. The connection of the two parts is indicated by 14. The stirring elements 5, 6 are arranged on the plates 4, 4a in such a way that their shadow areas are almost contiguous, as seen in the direction of revolution. 15 indicates a stirred kettle. The stirrer arms 3, 3a of the stirrer 1 are twisted relative to one another by about 60° in each case. Twisting up to 90° is possible. Twisting of the stirrer arms 3a of the stirring elements 6 near to the bottom, relative to the stirrer arms 3, located above, of the stirring elements 5 near the wall, was omitted in FIG. 1 only in order to make the illustration clearer.

According to FIG. 3, the plates 4 are helically bent and connect the ends of the stirrer arms 3. The drive shaft 2 is provided with a helix 16, the conveying direction of which is opposite to the conveying direction of the stirring elements 5.

The stirrer can be used preferentially wherever good heat transfer from the product to the vessel wall is important. By means of this stirrer, intensive circulation and thorough mixing is obtained both in highly mobile fluids and in fluids higher viscosity. The stirrer is particularly suitable for solution polymerization and bulk polymerization, and also for the treatment of shear-sensitive dispersions and synthetic resins of any type.

We claim:

1. A stirrer for stirring near a vessel wall and for directing stirred material toward a vessel drain, the stirrer having a drive shaft, stirrer arms, plates and stirring elements, each stirrer arm being radially arranged on and supported by the drive shaft, each plate being secured to a stirrer arm at a position near the vessel wall and supporting a plurality of stirring elements, and each stirring element being secured to a plate, being positioned between the plate and said vessel wall, having a leading edge, being separated from each other stirring element secured to the same plate and being inclined to direct stirred material toward the vessel drain, the stirring elements attached to a given plate being displaced from each other in the direction of revolution so that the leading edge of each successive stirring element in the direction of the vessel drain and on a plate is behind that of the immediately preceding stirring element in said direction of revolution.

2. A stirrer as claimed in claim 1, wherein some of the stirrer arms (3, 3a) are designed as conveying elements (11, 12) which are inclined in a direction opposite that of the stirring elements (5).

3. A stirrer as claimed in claim 1, wherein the stirrer arms (3) are designed to have a variable length.

4. A stirrer as claimed in claim 1, wherein each plate (4) is perpendicular to the stirrer arm (3) to which it is secured.

5. A stirrer as claimed in claim 1, wherein the plate (4) are arranged to be rotatable about their respective stirrer arm axis.

6. A stirrer as claimed in claim 1 wherein each stirring element is inclined relative to each other stirring element secured to the same plate.

7. A bottom-discharge vessel having a stirrer as claimed in claim 1 and which further comprises similarly-disposed plates and respective stirring elements adjacent the bottom of the vessel and secured to the drive shaft.

8. A stirrer as claimed in claim 1 wherein the stirring elements are inclined only slightly from the horizontal.

9. A stirrer for stirring near a vessel wall and having a drive shaft, stirrer arms, plates, stirring elements and a helix, the stirrer arms being radially arranged and secured to the drive shaft, the plates being secured to said stirrer arms at a position near the vessel wall, a plurality of the stirring elements being at a distance from each other and being secured to each plate in such a way that their shadow areas overlap in the direction of revolution or are at least almost contiguous, and the helix being secured to the drive shaft.

10. A stirrer as claimed in claim 9 wherein the stirring elements are inclined relative to one another.

11. A stirrer as claimed in claim 9 wherein the stirring elements are positioned to direct stirred material in one direction and the helix is designed to direct stirred material in a different direction.

* * * * *